(12) United States Patent
Andersen

(10) Patent No.: US 11,603,794 B2
(45) Date of Patent: Mar. 14, 2023

(54) METHOD AND APPARATUS FOR INCREASING USEFUL ENERGY/THRUST OF A GAS TURBINE ENGINE BY ONE OR MORE ROTATING FLUID MOVING (AGITATOR) PIECES DUE TO FORMATION OF A DEFINED STEAM REGION

(71) Applicant: Leonard Morgensen Andersen, New York, NY (US)

(72) Inventor: Leonard Morgensen Andersen, New York, NY (US)

( * ) Notice: Subject to any disclaimer, the term of this patent is extended or adjusted under 35 U.S.C. 154(b) by 0 days.

(21) Appl. No.: 17/233,993

(22) Filed: Apr. 19, 2021

(65) Prior Publication Data

US 2022/0056842 A1 Feb. 24, 2022

Related U.S. Application Data

(63) Continuation-in-part of application No. 15/443,692, filed on Feb. 27, 2017, now abandoned.

(60) Provisional application No. 62/387,515, filed on Dec. 30, 2015.

(51) Int. Cl.
*F02C 3/30* (2006.01)
*F01K 21/04* (2006.01)

(52) U.S. Cl.
CPC ............ *F02C 3/305* (2013.01); *F01K 21/045* (2013.01); *F01K 21/047* (2013.01); *F05D 2220/72* (2013.01)

(58) Field of Classification Search
CPC ...... F02C 3/305; F01K 21/045; F01K 21/047; F01K 7/223; F01D 1/10; F01D 1/06; F01D 1/023; F01D 25/305; F05D 2210/42
See application file for complete search history.

(56) References Cited

U.S. PATENT DOCUMENTS 1,405,091 A * 1/1922 Baumann ................ F01D 25/30
415/144
2,129,529 A 9/1938 Howard
(Continued)

FOREIGN PATENT DOCUMENTS

CN 203285490 11/2013
CN 104696072 6/2015
(Continued)

*Primary Examiner* — Ted Kim
(74) *Attorney, Agent, or Firm* — Leason Ellis LLP

(57) ABSTRACT

A gas turbine engine comprising a housing coupled to an upstream source of hot gas and superheated water droplets, the housing having a centerline, an annular bay section positioned radially away from the centerline and protruding in an upstream direction, a rotatable shaft positioned along the centerline, a fluid mover coupled to the rotating shaft and positioned to receive the hot gas and superheated water droplets from the upstream source and to move the hot gas and superheated water droplets radially toward the annular bay section of the housing, a separator plate that is fixedly coupled to the housing; and an extractive turbine assembly positioned downstream from the separator plate and the annular bay section. The superheated water droplets mix thoroughly with the hot gas inside the annular bay section causing the water droplets to covert to steam, and the steam flows to the extractive turbine, increasing an efficiency of turbine rotation.

19 Claims, 14 Drawing Sheets

(56) References Cited

U.S. PATENT DOCUMENTS

| | | | | |
|---|---|---|---|---|
| 2,172,993 | A * | 9/1939 | Sturtevant | F02C 3/06 415/117 |
| 2,359,108 | A | 9/1944 | Hoskins | |
| 2,396,159 | A * | 3/1946 | Mortimer | F01D 25/30 415/102 |
| 2,647,368 | A * | 8/1953 | Triebbnigg | F01D 5/08 60/39.5 |
| 3,066,912 | A * | 12/1962 | Scheper, Jr. | F01D 25/32 415/121.2 |
| 3,093,968 | A | 6/1963 | Osofsky | |
| 3,396,538 | A | 8/1968 | Wetherbee, Jr. | |
| 4,118,145 | A | 10/1978 | Stahl | |
| 4,338,780 | A | 7/1982 | Sakamoto | |
| 4,813,227 | A * | 3/1989 | Rice | F01K 23/103 60/774 |
| 4,893,468 | A | 1/1990 | Hines | |
| 4,982,564 | A | 1/1991 | Hines | |
| 7,143,957 | B2 | 12/2006 | Nelson et al. | |
| 8,241,005 | B2 | 8/2012 | Emmerson et al. | |
| 8,549,862 | B2 * | 10/2013 | Kendrick | F23R 3/346 60/750 |
| 8,671,696 | B2 | 3/2014 | Andersen | |
| 9,039,370 | B2 | 5/2015 | Zhang et al. | |
| 9,068,468 | B2 | 6/2015 | Simpkin | |
| 9,175,567 | B2 | 11/2015 | Aggarwala et al. | |
| 9,188,028 | B2 | 11/2015 | Esakki et al. | |
| 9,200,540 | B2 | 12/2015 | Rofka et al. | |
| 9,209,730 | B2 | 12/2015 | Scipio et al. | |
| 9,217,367 | B2 | 12/2015 | Sander et al. | |
| 9,222,414 | B2 | 12/2015 | Eto et al. | |
| 9,376,933 | B2 | 6/2016 | Andersen | |
| 2004/0025513 | A1 | 2/2004 | Walsh et al. | |
| 2009/0116955 | A1 * | 5/2009 | Dauriac | F02C 3/10 415/177 |
| 2012/0272635 | A1 | 11/2012 | Andersen | |
| 2013/0285379 | A1 | 10/2013 | Seeley et al. | |
| 2015/0159558 | A1 | 6/2015 | Scipio et al. | |
| 2015/0176417 | A1 | 6/2015 | Zelmer | |
| 2017/0306843 | A1 | 10/2017 | Andersen | |

FOREIGN PATENT DOCUMENTS

| | | |
|---|---|---|
| CN | 104981587 | 10/2015 |
| EP | 2 937 528 | 10/2015 |
| RU | 002163671 | 2/2001 |
| RU | 002326246 | 6/2008 |
| RU | 002561780 | 9/2015 |
| WO | WO 2015/159310 | 10/2015 |

* cited by examiner

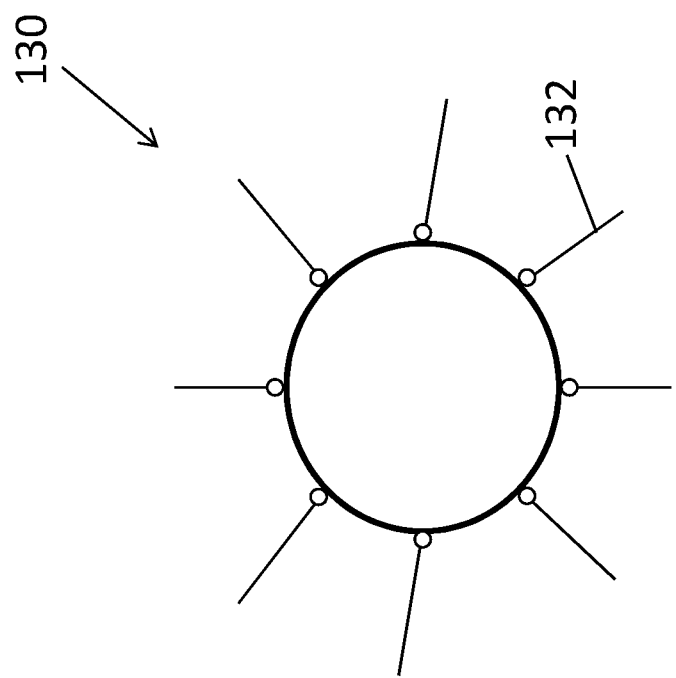

METHOD AND APPARATUS FOR INCREASING USEFUL ENERGY/THRUST OF A GAS TURBINE ENGINE BY ONE OR MORE ROTATING FLUID MOVING (AGITATOR) PIECES DUE TO FORMATION OF A DEFINED STEAM REGION

CROSS REFERENCE TO RELATED APPLICATION

The present application is a continuation-in-part (CIP) of U.S. patent application Ser. No. 15/443,692 entitled "Method and Apparatus for Increasing Useful Energy/Thrust of a Gas Turbine Engine by One or More Rotating Fluid Moving (Agitator) Pieces Due to Formation of A Defined Steam Region" which was filed on Feb. 27, 2017, now abandoned, and is incorporated by reference herein in its entirety for any purpose. The '692 application in turn claims priority to and the benefit of U.S. patent application Ser. No. 62/387,515, filed on Dec. 30, 2015, which is also hereby incorporated by reference in its entirety.

TECHNICAL FIELD

The present invention generally relates to generation of electricity from hot gas flow, and in particular relates to increasing the efficiency of electricity generation from hot gas flow by the addition of water droplets which are converted to steam by radial flow.

BACKGROUND

Gas turbine engines (also called combustion turbines) can be used in many different commercial settings. For example, gas turbine engines are used in jet engines, turboprop engines, auxiliary power units, industrial power generation systems, and industrial mechanical drive systems, etc.

In the jet engine and the turbine engine technical fields, there has been a constant endeavor to increase energy output per unit of fuel. Generally, in a gas turbine installation, a part of compressed air generated from a compressor is used for turbine cooling. Thus, an improvement in power efficiency and an increase in an output of a gas turbine system can be achieved by increasing the cooling capability of cooling air and reducing the amount of compressed air required for cooling. To that end, a technique for reducing the flow rate of compressed air required for cooling blades is practiced. A turbine blade cooling circuit is often used. However, the high pressure from the compressor makes it difficult for the turbine blade cooling circuit to operate in an ideal manner.

A gas turbine or jet engine typically includes a compressor assembly for compressing a working fluid, such as air. The compressed air is flowed into a combustor which heats the fluid causing it to expand. The expanded fluid is then forced through the turbine.

The output of known gas turbine engines is limited by an operating temperature of the working fluid at the output of the compressor assembly. At least some known turbine engines include compressor cooling devices, such as intercoolers, to extract heat from the compressed air to reduce the operating temperature of the flow exiting the compressor. As a result of the decreased temperatures, increased power output can be achieved by increasing flow through the compressor assembly.

To facilitate additional cooling, at least some gas turbine engines include water injection systems that overcome some of the shortcomings associated with intercoolers. Such systems use a plurality of nozzles to inject water into the flow during engine operation.

The essential goal in designing the jet engine has always been to produce more thrust and fuel efficiency to achieve turbine durability (that is, an improved component life). To do so, the combustor needs to operate at a higher temperature, which requires cooling the turbine. The first mass produced axial engine, Jumo 004B, utilized internal cooling for the turbine blades. So, the concept is as old as the turbojet engine itself. Fuel efficiency can further be enhanced by cooling the turbine blades with airflow or liquid-flow into gas (steam) through them. Afterburners provide a means for an emergency boost; however, they suffer from fuel inefficiency relative to the other working components of the turbine.

FIG. 1 illustrates a conventional driven apparatus 10 that contains an engine and in particular, the apparatus 10 is in the form of an aircraft that includes a turbine engine 20. However, the present invention is not limited to being used in an aircraft and it will be appreciated that it equally can be used in other gas turbine settings including a vehicle, ship, electrical power generation, etc. As shown in FIG. 2, the turbine engine 20 includes a number of components some of which can be broadly categorized and identified as a compressor 30, a combustion chamber 40, a fuel burner 50, a turbine 60, and a nozzle 70. FIG. 2 illustrates one exemplary form of a turbine engine in the form of a jet engine, a turbojet, a gas turbine, a ramjet, or a scramjet engine; however, it will be appreciated that the turbine engine 20 can be of another engine type.

FIG. 2 illustrates an overview of the jet engine 20, wherein air 21 is drawn into the turbojet by the high by-pass fan 25 and the compressor 30. The compressor 30 is basically a large spinning fan. The compressor slows down the incoming air, raising its pressure, and delivers it to the combustion chamber 40. Fuel is injected into the high-pressure air in the combustion chamber and ignited by the fuel burner 50. The resulting hot gases 41 expand and rush first through the turbine 60 and then through the nozzle or exhaust section 70 located at the rear. A rotating shaft 80 may connect all the above components to provide momentum when rotating. A forward thrust is generated as a reaction to the rearward momentum of the exhaust gases.

The turbine 60 includes a series of bladed discs that act similar to a windmill, gaining energy from the hot gases 41 leaving the combustor. Some of this energy is used to drive the compressor, and in some turbine engines (i.e., turboprop, turboshaft or turbofan engines), energy is extracted by additional turbine discs and used to drive devices such as propellers, bypass fans, helicopter rotors or electrical generators. These series of bladed discs are known as turbine sections (or hot sections).

The hot exhaust 41 acts on the turbine blades, while leaving the combustion chamber 40 causing the turbine blades to spin around. A forward thrust is generated as a reaction to the rearward momentum of the exhaust gases when the hot gasses 41 rush toward the blades leaving the nozzle (exhaust section) 70. The turbine 60 is designed to provide mechanical energy and rotation to the compressor.

The purpose of the turbine is to provide momentum to the compressor 30 that is attached by the rotating shaft 80, thereby enabling the compressor 30 to continually draw in more air. Thus, the air that is compressed in the compressor 30 and then heated in the combustion chamber 40 is not only used to provide a forward thrust but also to drive the turbine 60 that drives the compressor 30 that compresses the air.

The difficulty with making the exhaust gases drive a turbine 60 is that the forward thrust depends upon the difference in pressure between the closed and open ends of the combustion chamber 40, and if the escaping gases have to push against an object (e.g., the turbine blades) that difference in pressure is lessened. In other words, a pressure at the rear of the system detracts from the forward thrust. Thus, the designer's aim in a turbojet engine is to reduce to a minimum the power taken by the turbine 60 to compress the air so that the maximum amount of forward thrust is available.

Gas turbine engines are thus rotary internal combustion engines with an air compressor followed by a combustion section followed by a turbine section. Useful work is obtained from the shaft(s) connecting the compressor to the turbine and from flow of hot gas coming out of the turbine section. More recently, the hot thrust gas has been used to heat steam boilers creating steam which drives a steam turbine. This arrangement is called combined cycle power.

In the last five years, there has been work in mixing water with one or more rotary pieces to generate small droplets going to steam in a swirling pattern with the main shaft of the gas turbine as a center line of the swirling action. Such an arrangement is covered in Applicant's U.S. Pat. No. 8,671,696 and in Applicant's U.S. Pat. No. 9,376,933, each of which is hereby incorporated by reference in its entirety. The water swirled in gas turbine technology has been spoken of as improving thrust in aircraft propulsion and useful work output in form of more electricity output per unit of fuel.

In electrical generation, a chamber is used having a first end in which steam is formed at a gas turbine engine, and a second end having an extractive turbine connected to an electrical generator. The back pressure resulting from the conversion of water droplets to steam thrust impacts the turbine connected to the gas turbine's combustion section.

FIG. 3 generally illustrates the use of a combustion (gas) turbine that is installed in an environment in which electricity is generated, such as a natural-gas-fueled power plant. While this arrangement can be fairly complex, the arrangement basically involves three main sections:

The compressor, which draws air into the engine, pressurizes it, and feeds it to the combustion chamber at speeds of hundreds of miles per hour.

The combustion system, typically made up of a ring of fuel injectors that inject a steady stream of fuel into combustion chambers where it mixes with the air. The mixture is burned at temperatures of more than 2000 degrees F. The combustion produces a high temperature, high pressure gas stream that enters and expands through the turbine section.

The turbine is an intricate array of alternate stationary and rotating aerofoil-section blades. As hot combustion gas expands through the turbine, it spins the rotating blades. The rotating blades perform a dual function: they drive the compressor to draw more pressurized air into the combustion section, and they spin a generator to produce electricity.

These three primary sections are mounted on the same shaft. The rotation of the shaft drives the compressor to draw in and compress more air to sustain continuous combustion. The turbine shaft work is also used to drive other devices, such as one or more electric generators that may be coupled to the shaft. The energy that is not used for shaft work comes out in the exhaust gases, so these have either a high temperature or a high velocity. The purpose of the gas turbine determines the design so that the most desirable energy form is maximized. To optimize the transfer of kinetic energy from the combustion gases to shaft rotation, gas turbines can have multiple compressor and turbine stages.

In electricity generation, a generator is a device that converts mechanical energy to electrical energy for use in an external circuit.

In FIG. 3, a first generator 90 can be coupled to a gas turbine unit 91 at one end of a shaft that is associated with the gas turbine unit 91 and a second generator 93 can be coupled, by hot thrust gas acting on an extractive turbine 92, to the gas turbine unit 91 at the other end of the shaft. The gas turbine unit 91 can have the same or similar construction as turbine 20 of FIGS. 1 and 2. It will also be understood, as described herein, that one or more extraction turbines can be incorporated into the design. As described herein, the present invention is designed to increase the efficiency and work output of one or more electric generators 90, 93 coupled thereto. As shown, the extractive turbine 92 can be operatively connected to the gas turbine unit 91 and the second generator 93 as described herein. As discussed herein, operation (rotation) of the extractive turbine 92 can drive the second generator 93 for production of electricity.

BRIEF DESCRIPTION OF THE DRAWING FIGURES

The invention is illustrated in the figures of the accompanying drawings which are meant to be exemplary and not limiting, in which like references are intended to refer to like or corresponding parts, and in which:

FIG. 4A is a front elevation view of an exemplary fluid moving device (agitator unit) that comprises a plurality of rotating blades;

Figure 11A:
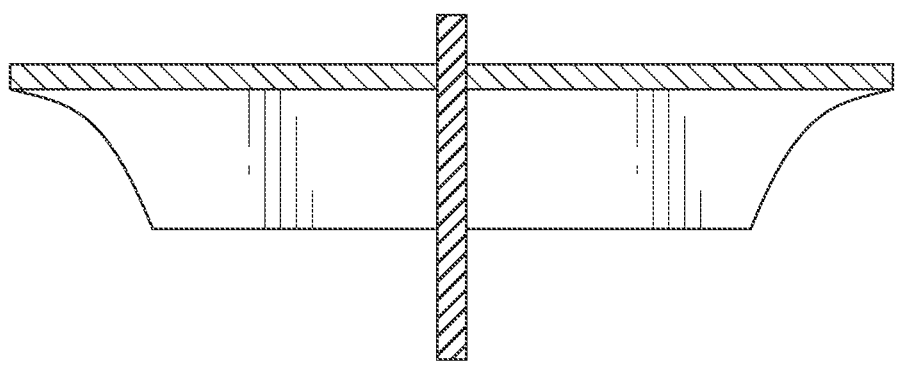
Figure 11B:
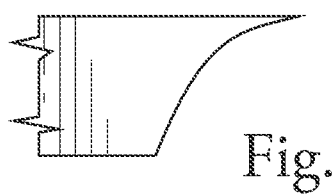
Figure 11C:
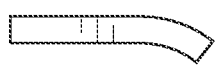
Figure 12A:
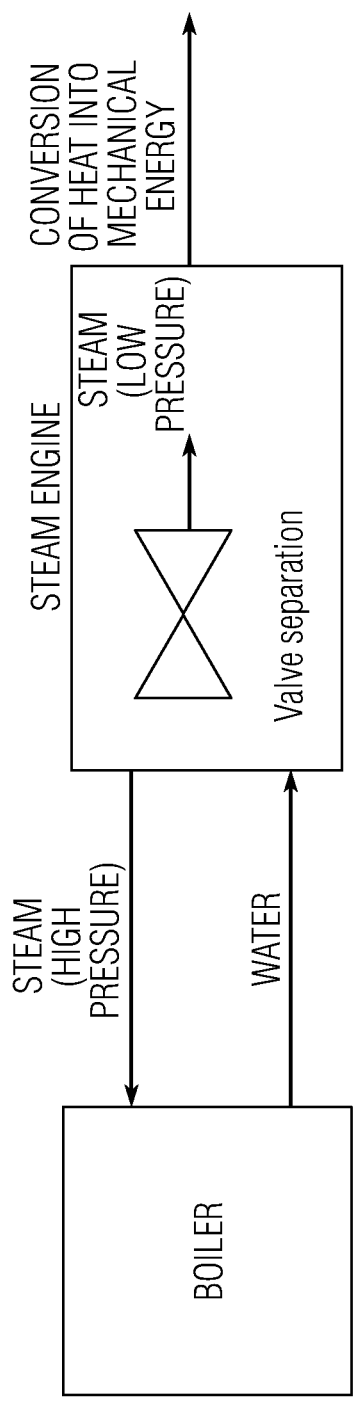
Figure 12B:
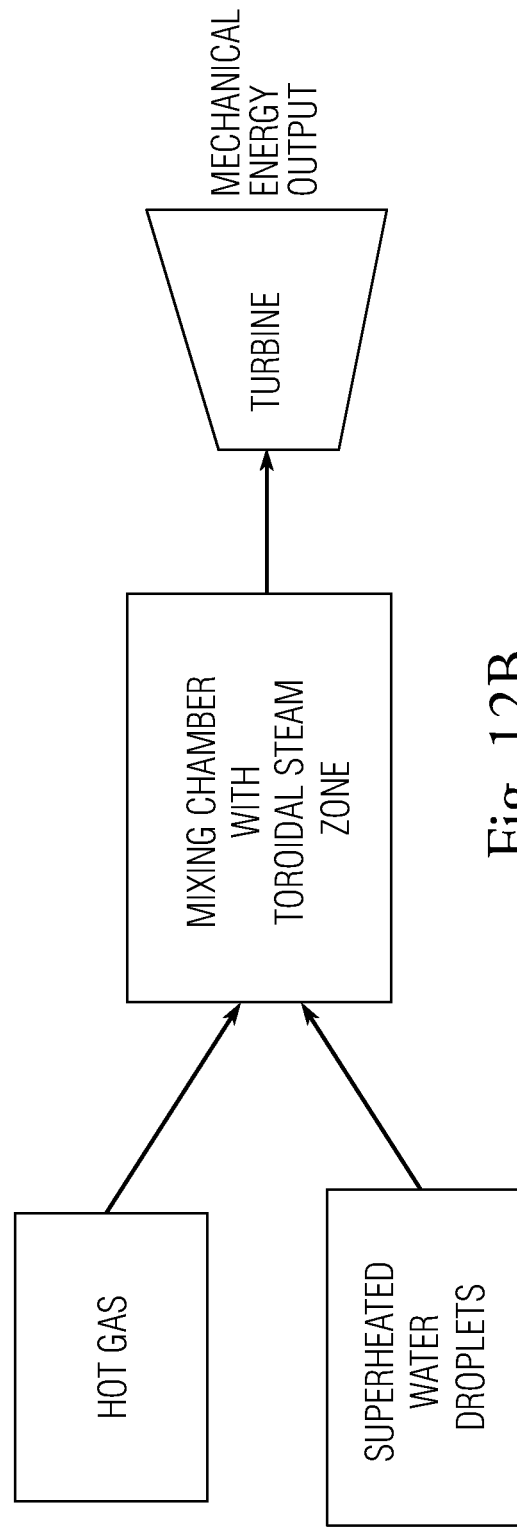

FIG. 11A-C show top, side and end views of an exemplary blade of a fluid mover according to the present invention;

FIG. 12A is a schematic block diagram of a conventional steam engine system; and FIG. 12B is a schematic block diagram showing power generation using the mixing chamber of the present invention.

DETAILED DESCRIPTION OF CERTAIN EMBODIMENTS

The present invention is directed to the use of a rotating agitator/mixer (fluid moving device or fluid directing member or element) to move the hot combustion gas (e.g., a thrust gas water droplet mixture) to increase thrust useful work output. As described herein, the rotating fluid moving device (agitator) can thus be understood as being a fluid mover of an agitator nature in that the rotating agitator is configured to act on fluid of a first nature so as to change a characteristic(s) thereof. For example, the rotating agitator can be configured to move the fluid in a certain manner such that the fluid assumes a concentrated area of a prescribed shape.

The water droplet to steam thrust augmentation is disclosed by the Applicant in the above mentioned patents which are incorporated herein and is a phenomena noted with a gas turbine device that operates with precipitation, etc.

Figure 4:
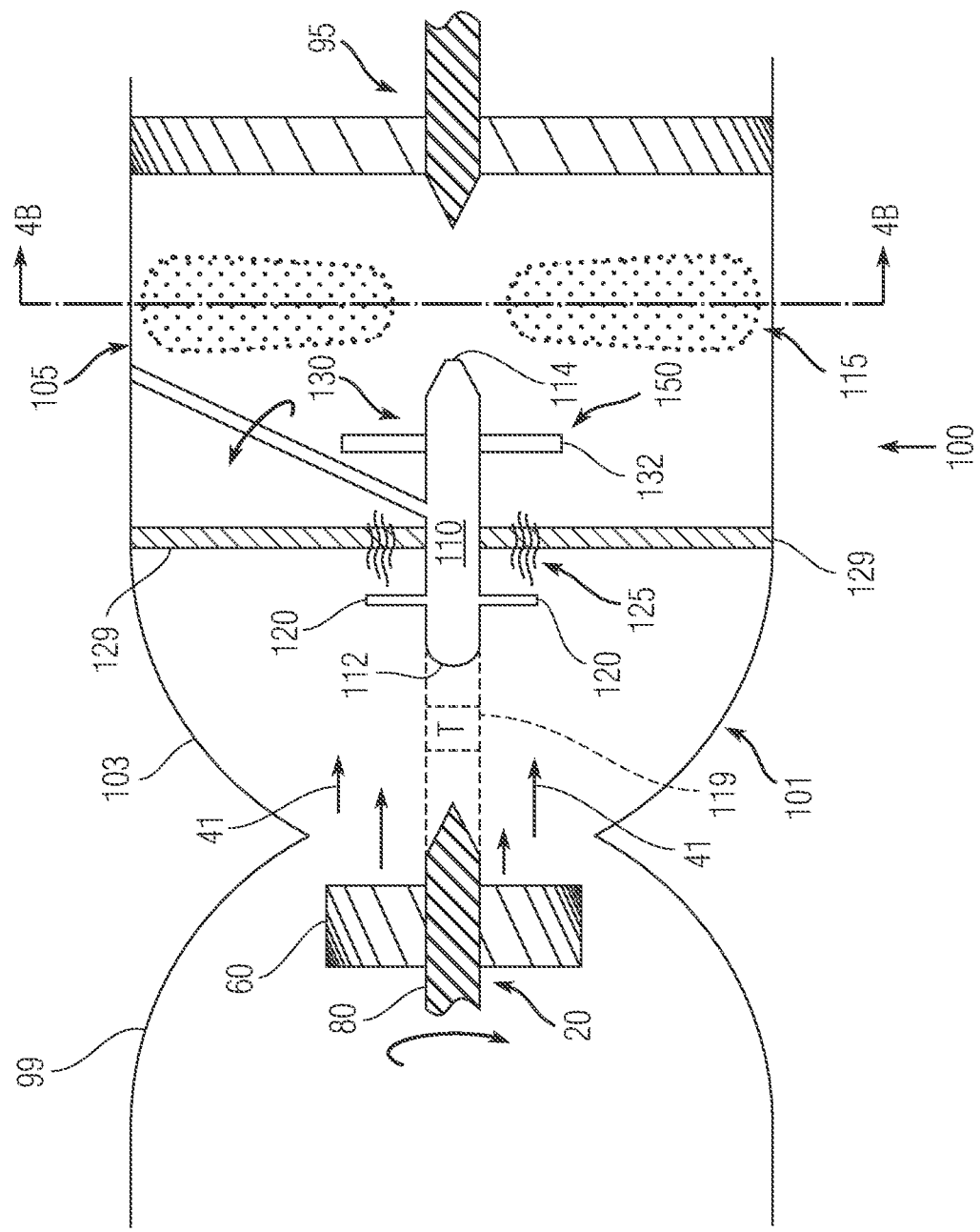
FIG. 4 is a mixing unit steam chamber that can be part of a combined cycle electrical generation unit.

FIG. 4 illustrates a mixing unit steam (steaming) chamber 100 that can be part of a combined cycle electrical generation unit (the units can be of a 1 MW to 400 MW size according to one embodiment) or can be used in combination with other electrical generating devices, such as electrical generators 90, 93 combined with the extractive turbine 92. Chamber 100 is located downstream of a gas turbine engine, such as the engine 20 of FIG. 1, which includes a rotating shaft 80 which is partially shown. The illustrated portion of the gas turbine engine 20 is the hot end of the gas turbine engine 20 and the rotating turbine 60 is generally shown (it will be appreciated that it traditional turbine design, rotating turbines cause gas rotation, while stators are used to straighten the gas flow so that the hot thrust gas generally exits in a linear manner). Operation of the gas turbine engine 20 produces hot thrust gas which is generally indicated at 41 and flows downstream from the rotating turbine 60. The hot thrust gas 41 is at high temperature, such as 1200° F., and moves at high speed in a direction toward the mixing chamber 100 (i.e., a downstream direction).

Mixing chamber 100, that is downstream of the gas turbine engine 20, has a non-conical shape. As shown, the mixing chamber 100 can have a hemispherical (semispherical) shape or other shape that is defined by a perpendicular plane relative to a center line of the gas turbine engine or a structure that is a combination of the gas turbine engine with another unit. As shown, the mixing chamber 100 is surrounded by a housing 101 that is defined by a curved end wall 103 that is adjacent (proximate) the gas turbine engine 20 and leads to a side wall 105. The mixing chamber 100 is positioned so that the hot combustion gas (hot thrust gas) is directed into the interior of the mixing chamber 100. Unlike in conical shaped housings, the end wall 103 is not defined by tapered surfaces but instead is a curved (concave) wall. Applicant has discovered that a non-conical shape for chamber 100 optimizes fuel to energy output relative to a conically shaped chamber 100.

As described herein, the housing that contains the upstream turbine of the GTE can be thought of as being a first housing section and the mixing chamber 100 can be thought of as being a second housing section that fluidly communicates with the first housing section. The first and second housing sections can be a single integral structure.

Within the chamber 100, a rotating agitator/mixer (fluid moving element) 150 is provided downstream of the turbine engine 20. The unit 150 has a rotating shaft 110. The illustrated shaft 110 has a first end 112 and an opposing second end 114 and can take the form of an assembly that is disclosed in either of Applicant's '696 patent or '933 patent. The first end 112 is defined by a rotating spray nozzle 120 which, in this case, is powered (rotated) by rotation of the shaft 110. The second end 114 of the shaft 110, according to one embodiment of the present invention, is used to rotate blades 132 that are characterized as turbine agitation components (turbine unit 130). Supports 129 can be used to suspend the agitator/mixer 150 within the chamber 100 and can be in the form of a support member, such as a bracket, etc. that attaches to the housing 101. In other words, the unit 150 in the illustrated embodiment features two main components, namely, a component or section that sprays liquid and the downstream fluid moving device (turbine agitator component). As described herein, these components can be separated from one another.

The rotating spray nozzle 120 is thus configured to receive and discharge liquid, which is preferably water. Reference legend 125 indicates a spray/mist form of water that travels in a swirling pattern in a direction toward the turbine agitation unit 130. As discussed herein, the turbine agitation unit 130 is configured to act upon this swirling spray/mist so as to increase the useful energy output thereof.

As an alternative to driving a device (i.e., the unit 150) that is located beyond the end of the gas turbine engine shaft 80 as disclosed in Applicant's '696 patent (to impart water to hot thrust gas or as in the present invention to achieve optimal to steam and useful energy output), a shaft of unit 150 can be connected to the end of the shaft 80 and can be attached optionally to a transmission or gear box that changes the rotational speed of a second shaft on a continuation of the centerline of the gas turbine engine 20 and is connected to the device that imparts water to hot thrust gas and/or to a device (e.g., unit 150) that enhances steaming and optimizes useful energy production. Alternatively, no transmission or gear box can be present between the two shafts 80, 110.

In FIG. 4, the dashed lines between shafts 80 and 110 show such an optional coupling therebetween, with the optional transmission being shown at 119.

FIG. 4A is a detailed view of the blades 132 that are part of the fluid moving device (agitation unit) 130 that is disposed at the second end 114. As can be seen, the blades 132 are spaced and extend circumferentially about a common hub. Since blades 132 are coupled to the shaft 110, rotation of the shaft 110 is translated into rotation of the blades 132. It will also be appreciated that the pitch of the blades 132 can be changed with a unit operating by a centrifugal force change mechanism or other means (See, FIG. 7). The blades 132 can thus be coupled to a hub or the shaft in such a way that angle between the blade 132 and the hub or shaft can be adjusted as by using a hydraulic mechanism or the like. The blades 132 can be pivotally attached to the hub or shaft and connected to a mechanical linkage that can be controlled so as to alter the angle of the blade 132.

It will be understood that while the illustrated embodiment is one in which the spray nozzle 120 and agitation unit 130 are part of shaft 110, the agitation unit 130 can be a completely separate unit within the chamber 100. Thus, the spray nozzle 120 and the agitation unit 130 can be separated from one another and not directly coupled to one another by a common element, such as shaft 110.

Figure 1:
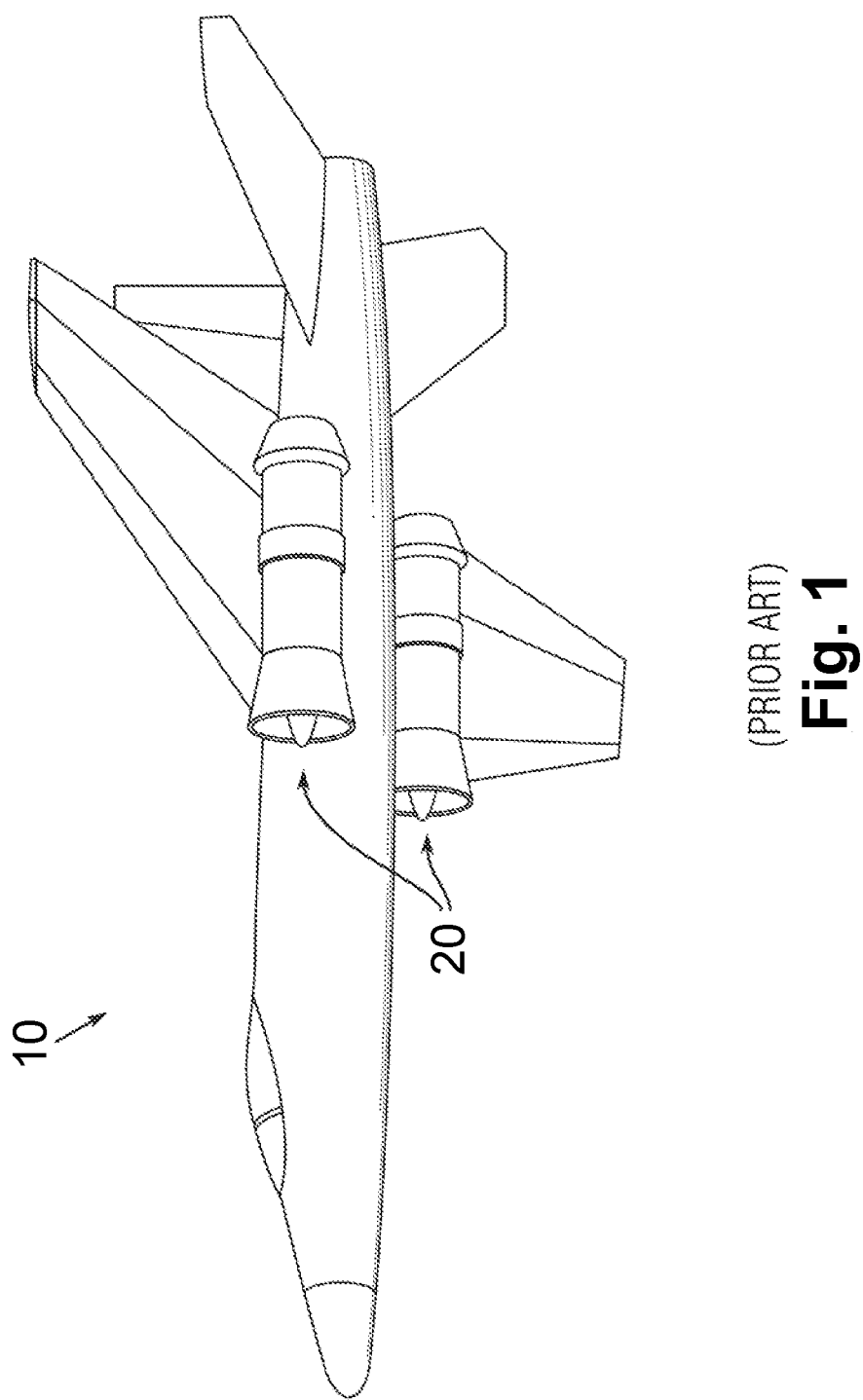
FIG. 1 is a schematic view of a conventional aircraft.
Figure 2:
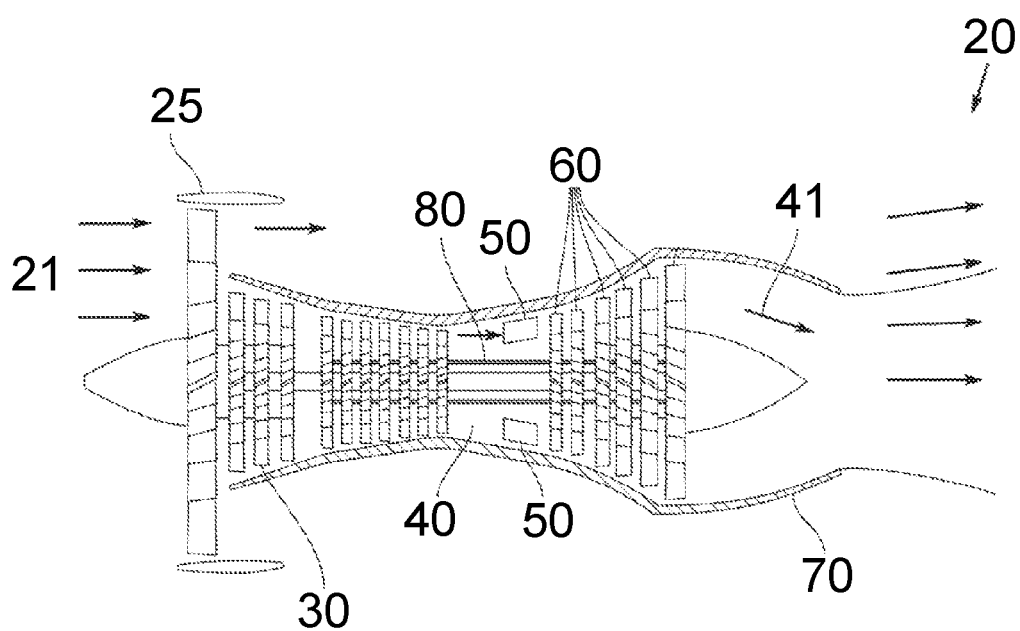
FIG. 2 illustrates various components of the conventional turbine engine.
Figure 3:
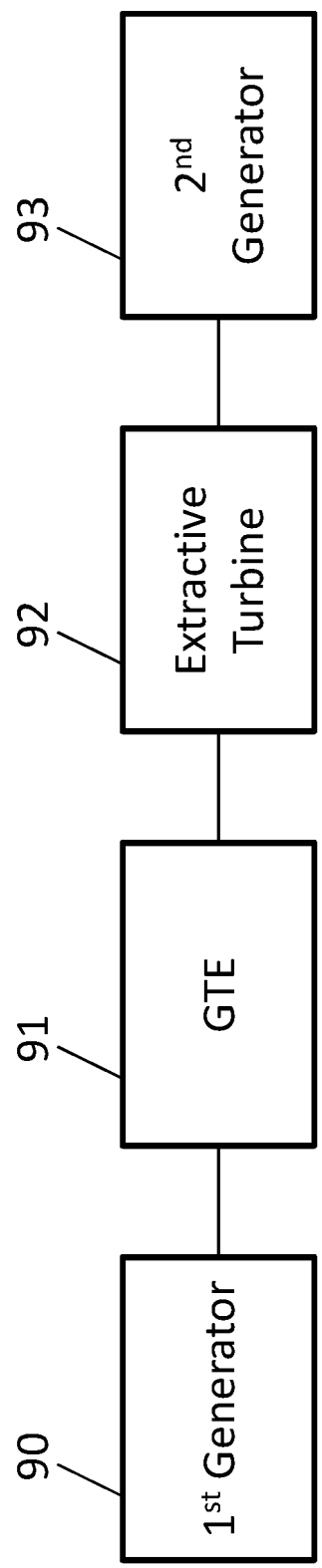
FIG. 3 is a schematic of an electricity generating arrangement based on gas turbine technology.
Figure 4B:
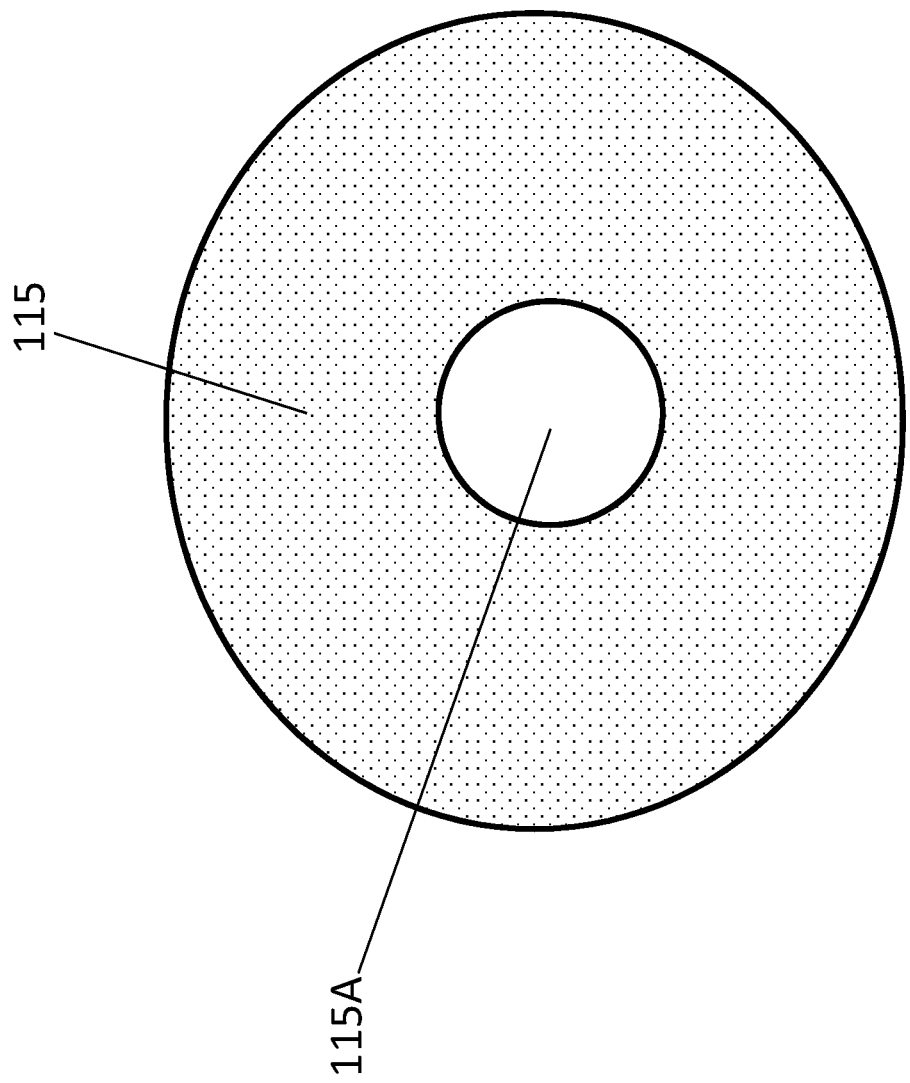
FIG. 4B is a cross-sectional view showing the annular shape area (volume/concentrated area) of rapid water droplet to steam phenomena and is a region of high pressure.

Within chamber 100 is a region 115 that is immediately downstream of the turbine agitation unit 130 and represents a region or space of intense water droplet to steam occurrence by virtue of agitation of the water droplets (i.e., moving of heated water droplets to cause a change in the water droplet quantity and/or size to optimize electricity/ thrust energy output). This region 115 thus represents a concentrated area of steam. This region 115 is thus the region at which the swirling water droplets from the rotating spray nozzle 120 is further acted upon by the agitation unit 130 which agitates the swirling water droplets 125 and causes transformation into steam in the region 115. This steam in the region 115 is then used to optimize electricity/thrust energy output in the intended application which can be in the form of the electrical power generation plant (system) shown in FIG. 3 or the aircraft 10 of FIG. 1 or any other suitable application in which a gas turbine engine is employed. FIG. 4B shows the annular shape of this region 115. Generation of steam in region 115 is thus used to optimize electricity/thrust energy output of the targeted system that the present invention is incorporated (as shown in FIGS. 1-3). Area 115A represents a center of the annular region 115 and therefore, this area 115A is at least substantially aligned with the rear of the GTE unit. Area 115A is at least substantially devoid of steaming occurrence since this would lessen fuel efficiency. In other words, the area 115A is not part of the concentrated annular shaped region 115 in which water vapor (steam) is located.

Thus, in accordance with the present invention, the fluid moving device (which is a turbine in nature and defined by blades 132 that can be part of a paddle propeller or other device) acts on the combined hot thrust gas and water droplets (located immediately downstream of the sprayer) to cause the combined hot thrust gas and water droplets to move in a curved swirled motion while also being moved in a radially outward direction in the non-conical shaped housing and the action of the rotating blades (so as to form the concentrated area of steam).

Figure 5:
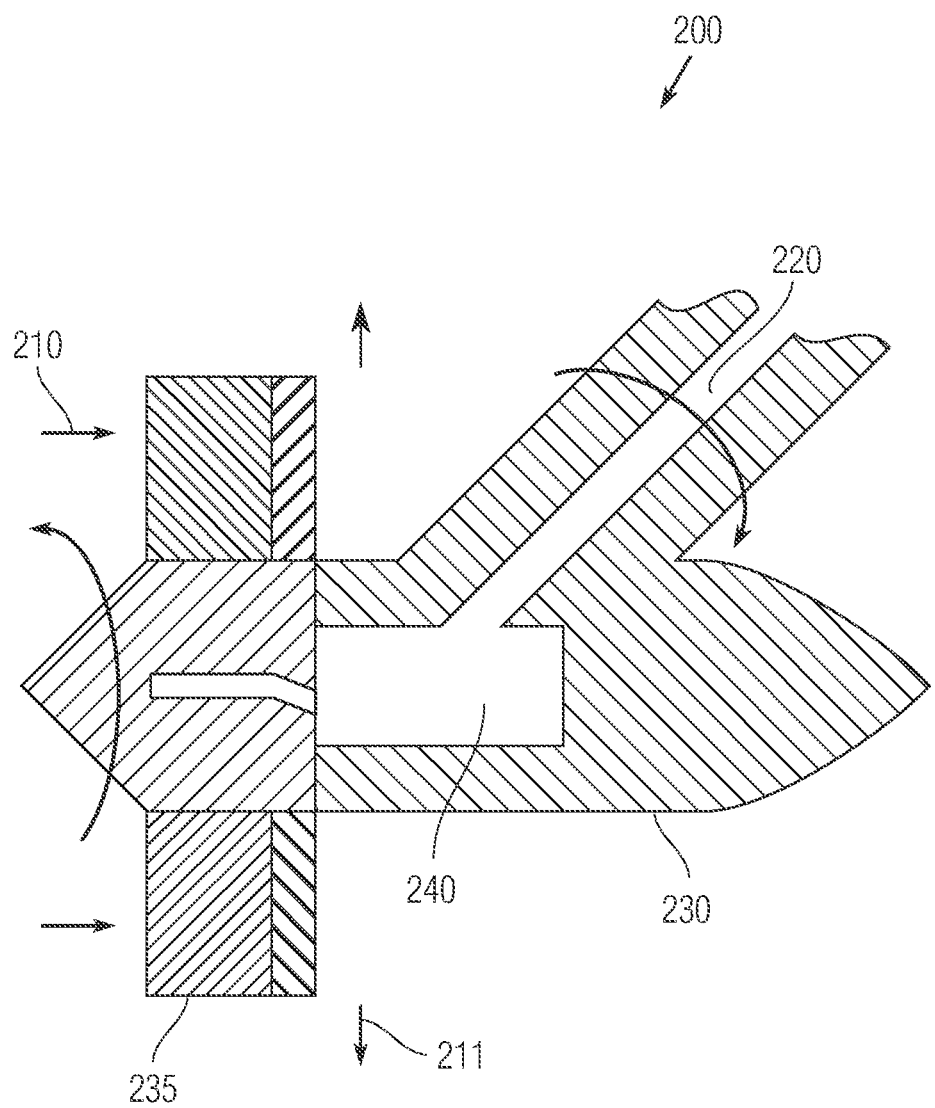
FIG. 5 is a schematic showing an area of hot thrust gas and water droplets being acted on so as to be moved in a radial outward manner to form a shaped water vapor region.

FIG. 5 illustrates a mixing unit that has a power shaft with a mixer/agitator at one end of the power shaft and a bearing at the other end. More particularly, FIG. 5 depicts a fluid moving device (mixing/agitator unit) 200 that is downstream from a compressor/turbine part of a gas turbine engine. Reference legend 210 represents thrust gas moving away from the compressor/turbine part. The thrust gas is moving at high speed and is hot and preferably includes water droplets. The thrust gas 210 as it immediately exits the turbine is at a greater temperature and as the thrust gas 210 moves downstream, heat continues to dissipate and the temperature of the thrust gas 210 is reduced. Reference legend 211 depicts radial outward movement of the thrust gas 210 and water droplets and can be thought of as a mass movement of the thrust gas 210 mixture with water droplets within the housing.

The unit 200 includes a rotating shaft drive 220 that can be associated with an electric motor/hydraulic/pin wheeling from the steaming chamber 100 or from the end of the gas turbine engine centerlined shaft 80 with or without a transmission. A bracket 230 or the like is provided and is stationary relative to the housing (casing) of the gas turbine engine 20. The bracket 230 has a rotating part 235 which moves the thrust gas and water droplets with a shaft that is approximately aligned with the centerline of the main shaft 80 of the gas turbine engine 20. A gear box or transmission 240 is provided and is configured to change direction of rotation and/or speed of rotation of an agitation/mass mover mixer assembly 250 which is configured to act upon the thrust gas/water droplet mixture in the manner described hereinbefore in that it causes a transformation to steam. In terms of applications of the present invention, it is envisioned that is can be incorporated into gas turbine engine applications which go from about 100 KW aircraft propulsion to 500 MW combined cycle electrical generation and include the electricity generation system generally shown in FIG. 3. The unit 200 thus can be configured to form an annular shaped formation of steam.

As described herein and according to one embodiment, the unit 200 can be directly connected to the main shaft of the GTE and thus, a common shaft drives both the turbine 55 of the GTE and the unit 200. It will be understood that the main shaft of the GTE can be formed of a plurality of shaft segments that are coupled to one another.

Figure 6:
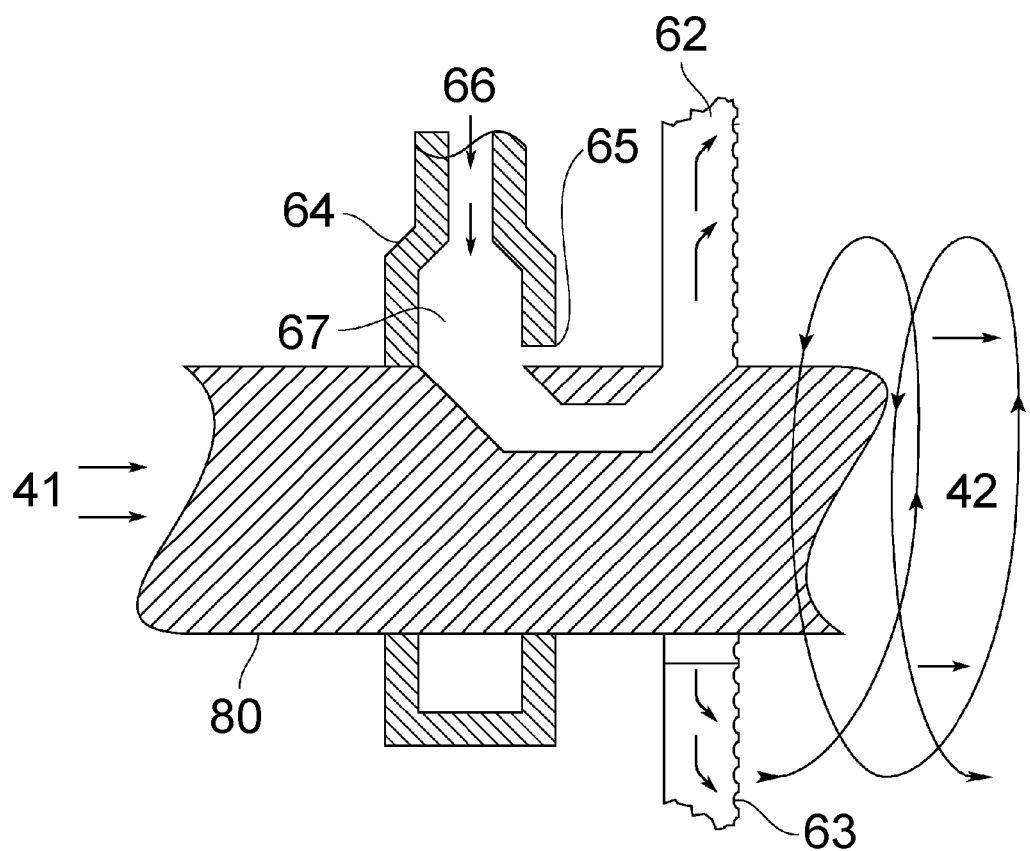
FIG. 6 is a schematic view of a sealed chamber as part of a spray nozzle having an opening to disperse liquid.

In one embodiment of the present invention, as illustrated in FIG. 6, liquid 66 flows from a liquid inlet towards rotating shaft 80 and then through a spray nozzle 63. The liquid 66 is delivered into a sealed chamber 64 having a seal opening 65 and hollow interior 67. The inlet is thus sealingly coupled to the shaft 80. The sealed chamber 64 facilitates liquid flow and surrounds the rotating shaft 80 to provide maximum cooling effect to the rotating shaft 80 and the atmosphere in the chamber 100. As the liquid 66 flows out from the open section of the seal opening 65 towards the blades 62, the liquid turns into liquid droplets 42. This transformation from liquid 66 to liquid droplets 42 is due to temperature and pressure variation. The sealed chamber 64 can be a mechanically attached washer shaped piece that allows liquid (water) to flow through and rotates at the same speed as the rotating shaft 80. In other words, a circumferential opening (e.g., 360 degree opening) is provided to allow flow of water in a 360 degree manner. Alternatively, the shaft 80 can include a flow channel that is in fluid communication with the hollow interior of the sealed chamber 64 to route the liquid through the chamber 64 into the hollow interior of the blade 63 and then to the holes formed therein for creation of the liquids droplets as described herein. The device of FIG. 6 is upstream of the rotatable agitator that acts on the swirling water droplets to form a shaped mass (concentrated area) of steam.

Figure 7:
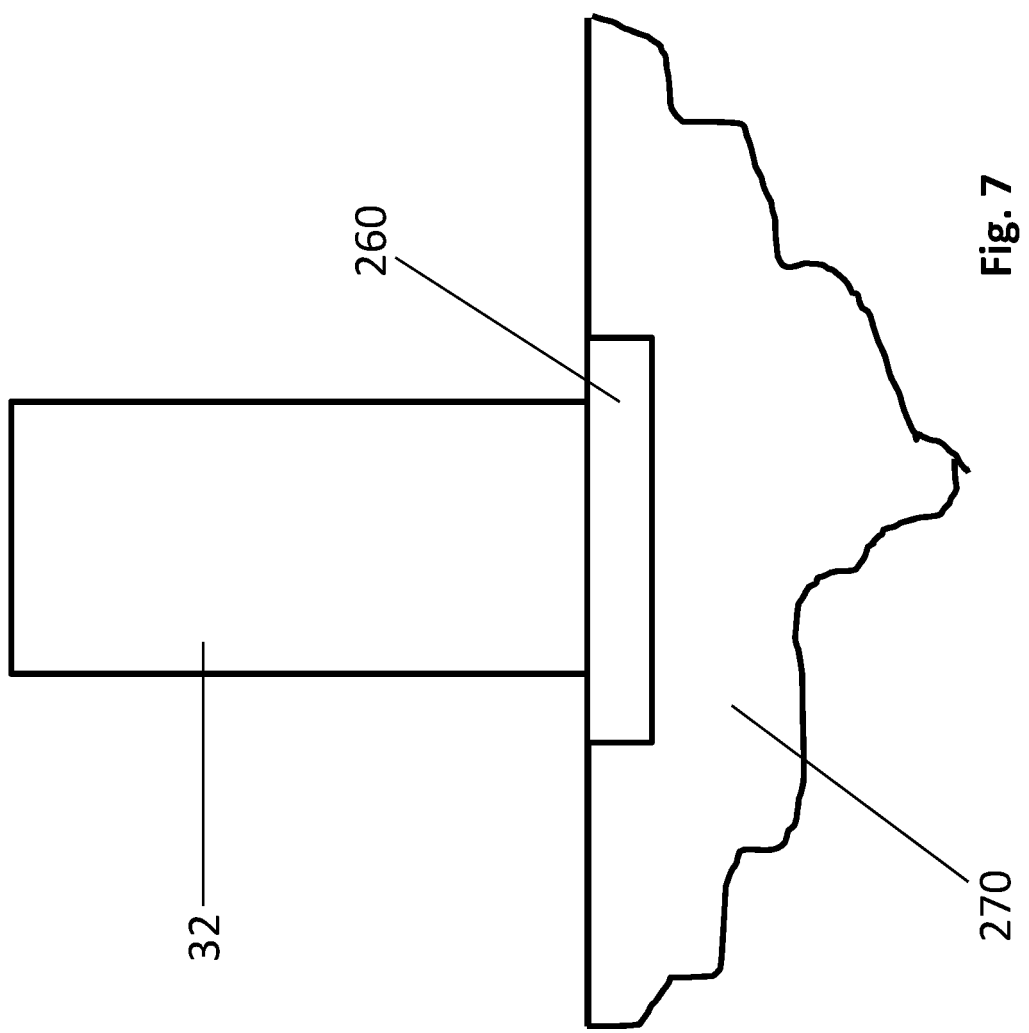
FIG. 7 is a close-up of one blade of the fluid moving device (agitator/mixer) of the present invention.

FIG. 7 depicts a blade or the like, such as blade 32, that is in contact with a fluid mixture composed of gas turbine engine thrust gas and water droplets. Mechanism 260 is configured to rotate and/or move the blade 32 in any direction. Hub 270 is a rotatable structure that is driven as by a drive shaft and is the member to which the blade 32 and mechanism 260 are attached.

Figure 8:
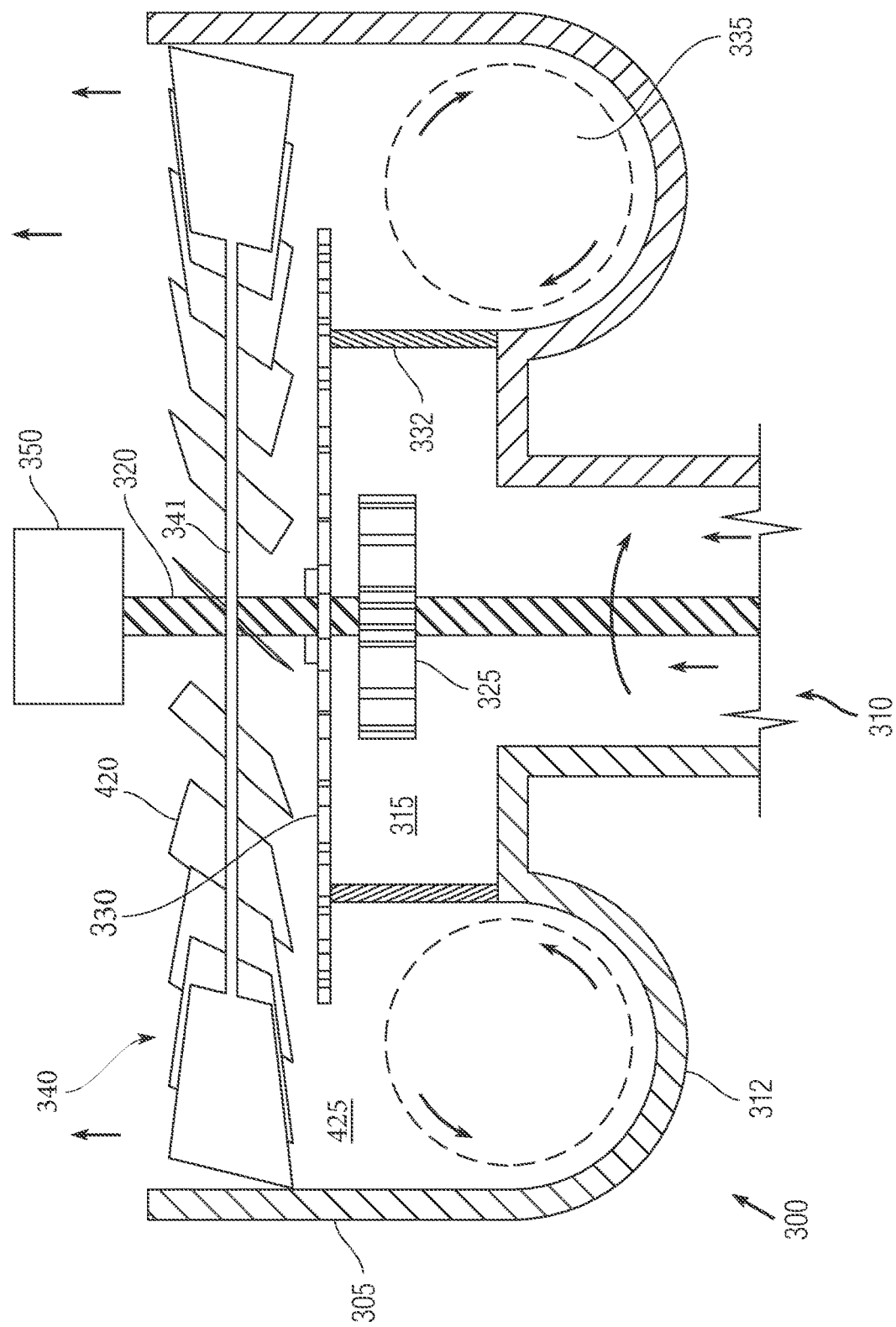
FIG. 8 is a cut-away view of another embodiment of a mixing chamber according to the present invention.

FIG. 8 illustrates another embodiment of a mixing chamber for generating steam according to the present invention. The mixing chamber 300 is defined by a housing 305 which is open at upstream and downstream (longitudinal) ends. At the upstream end, the housing 305 is joined to a conduit 310 leading from a source of hot gas and superheated water droplets. Superheated water is liquid water under increased pressure and heated to temperatures above the normal boiling point without boiling. The superheated water is thus in droplet form.

The source of hot gas and superheated water droplets (and/or other volatiles) can comprise a gas turbine, a combustion chamber of an engine, or a smokestack, for example. It will be appreciated that other sources are equally possible and the present disclosure is not limited to the aforementioned sources. The mechanism and placements for generating the superheated water droplets are discussed above and in the prior patents cited earlier. The hot gases and superheated water droplets produced in the source enter the inside of the mixing chamber 315 via the conduit 310 which, in this embodiment, is positioned such that it is aligned with the centerline of the mixing chamber 315. The water droplets are superheated to between 175° C. and 225° C. under pressure. It is noted that the superheated water droplets, once released from high pressure, are in an unstable state and will generally begin to convert steam shortly after release.

The conduit 310 can have a tubular shape (cylindrical shape).

On the lateral side of the conduit 310 at one end thereof, the housing 305 includes an annular bay 312 that protrudes backwardly in an upstream direction and thus fluid entering the annular bay 312 is moved upstream before swirling. The housing 305 further includes side walls that extend longitudinally in a downstream direction from the ends of the annular bay 312 distal from the centerline of the chamber that define the maximal width of the mixing chamber. The bay 312 can include a drain (not shown) to remove any condensates and particulates that can accumulate in the buys during operation.

A rotating shaft 320 extends from the end of the conduit 310 into the mixing chamber. A fluid mover 325 is positioned on the shaft 320 within the inside of mixing chamber 325. The fluid mover 325 includes blades that spin as the shaft 320 rotates. In some embodiments, the blades of the fluid mover 325 have a flat profile. When hot gases and superheated water droplets enter the mixing chamber, they start to expand and reach the fluid mover 325. The spinning action of the fluid mover 325 forces the incoming hot gas and superheated droplets in a lateral direction away from the centerline and toward the bay 312 of the housing that is located radially outward from both the conduit 310 and the fluid mover 325.

In one embodiment, the fluid mover 325 can have a circular shape; however, other shapes are equally possible. When the fluid mover 325 is circular shaped, it has a circular shaped peripheral edge. In one embodiment, as illustrated, the fluid mover 325 can be in the form of a shaft with a plurality of blades or protrusions 327 that extend radially outward from the center shaft. The blades are arranged circumferentially around the shaft. The blades are configured to promote the radial displacement of the superheated water droplets. The rotating blades cause the superheated water droplets to move radially outward toward and into the annular bay 312. The fluid mover 325 can thus have a hub that is attached to the shaft 320 with the blades extending radially outward.

In addition, a portion of the hot gas and water droplets that is not forced laterally by action of the fluid mover 325 but rather continues to expand along a longitudinal path comes into contact with a separator plate 330 that extends transversely within the mixing chamber. The separator plate 330 is connected to the housing 305 via supports 332. The supports 332 do not extend the entire height of the plate 330 and therefore, these supports 332 do not block lateral movement of the hot gas and water droplets. In other words, the hot gas and water droplets can flow around the supports 332, which can be in the form of supports rods, etc. In some embodiments the separator plate 330 extends for a majority of the entire width of the mixing chamber. As shown, the peripheral edge of the separator plate 330 can be located such that a plane that is located at (and passes therethrough) the peripheral edge of the plate 330 and is perpendicular to the longitudinal axis of the plate 330 extends into the annular bay 312. As illustrated, in one embodiment, the plane can intersect a center location of the bay 312. In other words, the outer portion of the annular bay 312 that is adjacent the outer wall of the housing is not covered by the separator plate 330. In one embodiment, the separator plate 330 covers between 25% and 50% of the area of the annular bay 312 and in other embodiment, the separator plate 330 covers between 40% and 60% of the annular bay 312.

As shown in FIG. 8, the upstream wall of the annular bay 312 is curved to promote a fluid swirling action as shown by the arrows.

As shown in the figures, in one embodiment, the separator plate 330 can have a disk shape with a diameter that is substantially greater than a diameter of the fluid mover 325 (the plate 330 can have a center hole through which the shaft 320 passes). The fluid mover 325 is immediately upstream of the plate 330. While the fluid mover 325 rotates, the plate 330 does not rotate and is fixedly attached to the casing (housing 305). In one embodiment, the thickness of the fluid mover 325 is greater than a thickness of the plate 330. The fluid mover 325 can be centrally located relative to the plate 330 (e.g., the fluid mover 325 and plate 330 are concentric). The diameter of the fluid mover 325 is less than the width (diameter) of the conduit 310 and thus, part of the separator plate is exposed radially outward from the fluid mover 325 (i.e., the fluid mover does not cover the radially outward portion of the separator plate. The diameter of the separator plate 330 thus extends partially into the annular bay 312.

As shown, at least a portion of the annular bay 312 is located upstream of the fluid mover 325 and as shown, a majority or a substantial area of the annular bay 312 can be located upstream of the fluid mover 325. The separator plate 330 thus does not rotate and separates two rotating structures, namely, the fluid mover 325 and the turbine 340.

The separator plate 330 has two important functions. First, is acts to divert any portions of hot gas and water droplets that pass downstream from the fluid mover 325 back toward the fluid mover 325. In this manner both the fluid mover 325 and blocking plate 330 ensure that a large proportion of the hot gas and superheated water droplets that enter the mixing chamber moves in a laterally (transverse) direction within the chamber toward the bay 312. In other words, for those water droplets that flow past the smaller diameter fluid mover 325, they contact the blocking plate 325 which has a greater diameter and then are directed back towards the fluid mover 325 which then acts on and radially (outwardly) disperses the water droplets into the annular bay 312.

The second function it performs is in radially diverting superheated water droplets that are present in the hot gases at an extractive turbine 340 positioned downstream from the separator plate 330. As shown in the figures, the turbine 340 can be thought of as having a center shaft 341 or the like and a plurality of turbines blades 420 that extend radially outward from the center shaft 341. The plurality of blades 420 are arranged circumferentially about the center shaft 341. It will also be seen that the blades of the fluid mover are of smaller size than the size of the blades 420.

As shown in FIG. 8, the diameter (width) of the center shaft 341 can be equal or approximately equal to the outer diameter of the blocking plate 330. The turbine 340 is downstream of the plate 330 and thus, the plate 330 covers the center shaft 341; however, the plurality of blades 420 are located radially beyond the outer peripheral edge of the plate 330 and are thus exposed. As shown in FIG. 8, beyond the outer peripheral edge of the plate 330 there is an annular space 425 that is located between the plate 330 and the inner wall of the housing 305. This annular space 425 defines a passageway or flow path around the plate 330 to the turbine blades 420. In other words, the steam that is generated in the bay 312 flows directly into this annular space 425 (around the plate 430) flows into contact with the turbine blades 420 to cause rotation thereof. The generated steam that moves with force into the turbine blades 420 acts as a moving force to cause rotation of the turbine. Since the turbine 340 is operatively coupled to the electric generator 350, the motion of the turbine 340 is used to generate electricity as is well known.

The blades 420 are in close proximity to the inner surface of the housing 305 and in one embodiment, the blades 420 can be within 5 inches or within 1 inch from the inner surface of the housing 305. The blades 420 thus cover essentially the entire annular bay 312.

Figure 9:
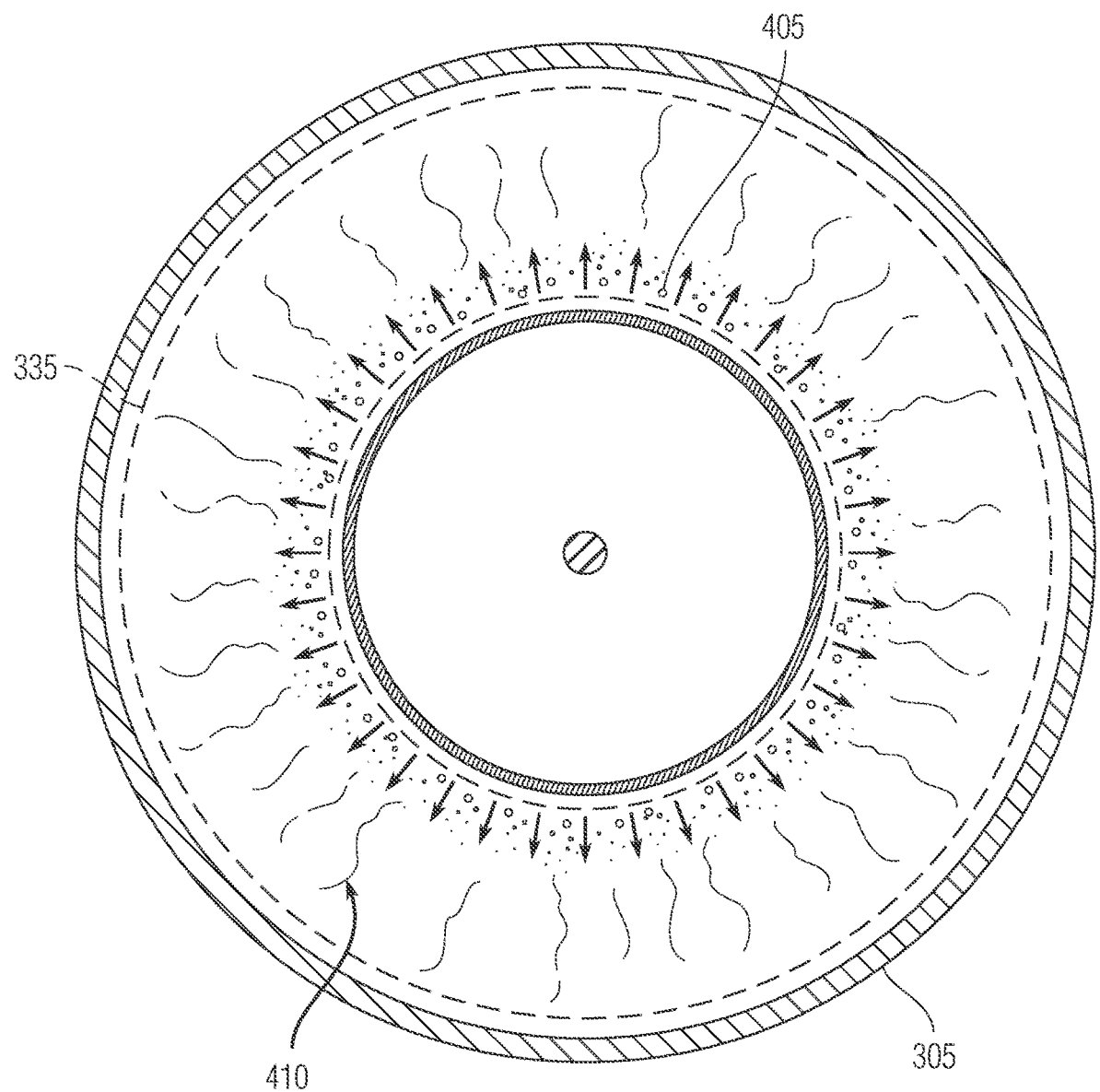
FIG. 9 is a first traverse cross-sectional view that illustrates the zone ("steam chamber") in which steam generation takes place.

The geometrical design of the annular bay 312 causes the hot gas and superheated water droplets to flow in curved or cyclical paths, indicated by the arrows shown in the figure. This flow pattern provides additional time for the water droplets in the generally annular (toroidal) space 335 within the bay to convert to steam. Accordingly, this toroidal space constitutes a steam chamber within the larger mixing chamber. The steam produced in the steam chamber expands rapidly and flows downstream toward the extractive turbine 340 that can also be connected to the shaft 320 (thus, the fluid mover 325 and turbine 340 can be attached to the same rotating shaft). FIG. 9 is a traverse cross-sectional view that more clearly shows the shape of the area in which steam generation takes place. In an annular region just outside of the periphery of the fluid mover there is a zone in which the hot gas and superheated droplets 405 are mixed. Further out in the radial direction is the steam chamber in which the superheated water droplets in the mixture are converted to steam 410. The steaming yields increased thrust for turning the extractive turbine 340, which can range in terms of turning velocity from approximately 10 to approximately 1000 revolutions per minute. In the embodiment depicted, the turbine 340 powers an electrical generator 350 coupled to the shaft 320 downstream.

The space 335 is at least partially contained within the annular bay 312 and can also be partially formed downstream of the bay 312.

In certain embodiments, the mixing chamber 300 can be employed to generate propulsion for a vehicle. In such embodiments, the extractive turbine is removed from the housing and instead, the steam generated in the annular bay is forced through an exit of the chamber (not shown in FIG. 8), increasing the efficiency of thrust energy generation. In other words, in a jet engine aircraft design, the extractive turbine 350 is eliminated and the steam generated in the annular bay is discharged through an exit as part of an exhaust generated by the jet turbine engine. The generation of steam in the annular bay increases the efficiency of thrust energy generation.

Figure 10:
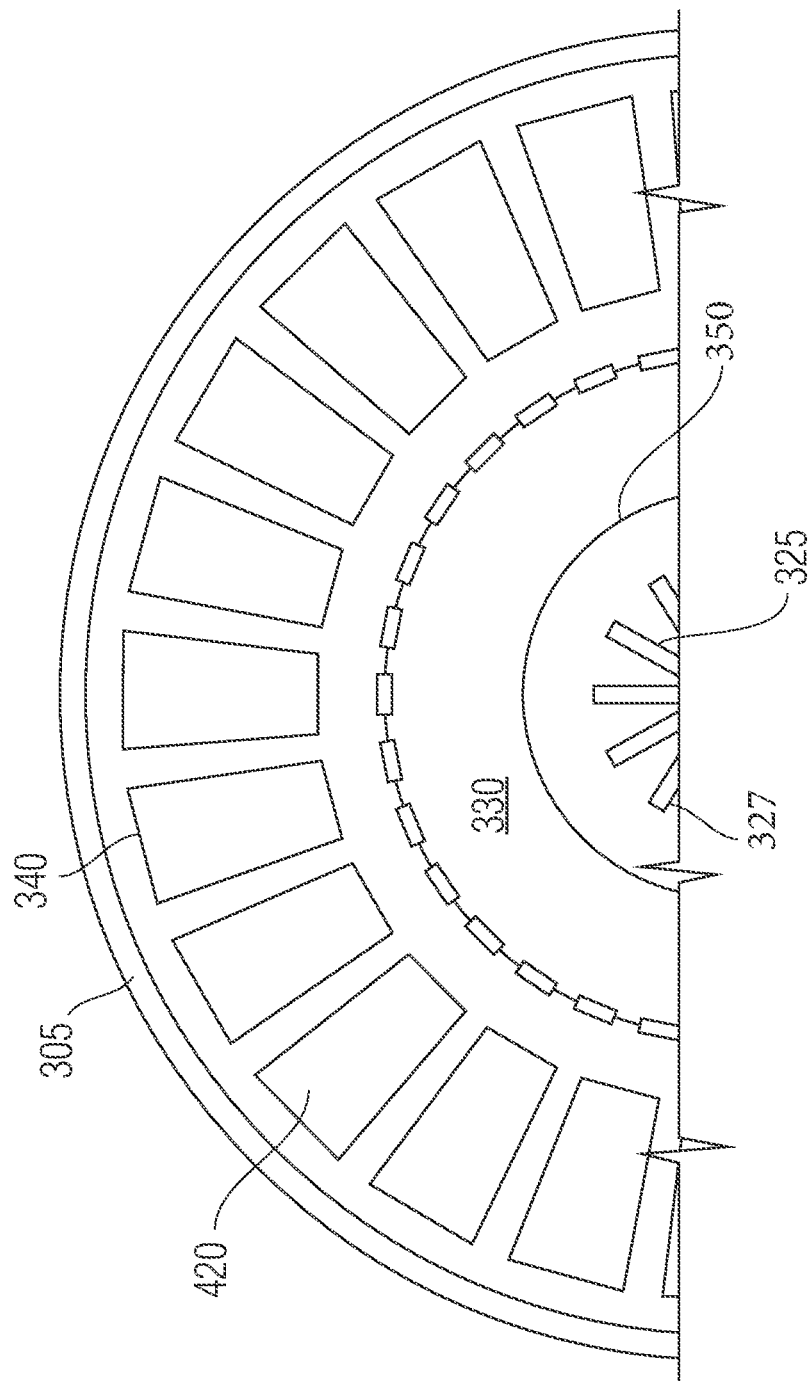
FIG. 10 is second traverse cross-sectional view of the mixing chamber.

FIG. 10 is another cross-sectional view that illustrates relative sizes (e.g., diameters) of the components such as the fluid mover 325 (smallest diameter), the separator plate 330 (relative larger diameter), the extractive turbine (still larger diameter) and the housing (largest diameter). This view also shows more clearly the blades (e.g., 420) of the extractive turbine 340 which receive the expanding steam generated in the steam chamber 335, causing the turbine to rotate. As mentioned, the expanding steam generated in the steam chamber 335 flows through the annular space 425 into contact with the blades 420. The blades 420 thus face the open bay 312 and are located directly downstream thereof and in axial arrangement therewith.

As mentioned, the same rotating shaft 320 can power both the fluid mover 325 and the turbine 340 and the fixed plate 330 accommodates the shaft 320 as by having an opening through which the shaft 320 passes since the plate 330 lies between the fluid mover 325 and the turbine 340. The present configuration thus first channels the superheated water droplets into the annular bay 312 and then next channels the generated steam into contact with the turbine blades 420.

FIGS. 11A-C show views of one embodiment of a blade of the fluid mover 325. The blade 505 has a trapezoidal shape in the top plan view of FIG. 11A. From the side view of FIG. 11B, the blade 505 has a sloping leading edge 508. The end view of FIG. 11C shows that the blade has a slightly curved profile. The geometry of the blade is designed to promote the efficiency of the centrifugal movement of the hot gas and water droplets as discussed above. It will be appreciated that the shapes and sizes of the blades 420 can be customized based on the particular application and it will be appreciated that many different blade types can be selected.

FIGS. 12A and 12B schematically illustrate a comparison between the conventional use of steam to generate mechanical energy (i.e., a steam engine) and the system of the present invention. As shown in FIG. 12A, in a conventional steam engine, a boiler generates steam which is then input to a steam engine or turbine. A conventional steam engine/turbine includes valve stages that separate various stages of combustion, compression and exhaust to regulate the pressure of the steam and thereby increase efficiency. In the schematic shown in FIG. 12B, this valve separation is not required as the pressure of the steam is controlled dynamically as described herein.

It will be appreciated that the fluid moving device/fluid mover (200, 325) of the present invention is designed to act on the mixture of hot thrust gas and water droplets such that the percentage of water vapor (steam) progressively increases in a downstream direction from the spray nozzle toward the fluid moving device and the action of the fluid moving device itself causes the mixture of hot thrust gas and water droplets to be at least substantially converted into all water vapor (steam). In other words, when the water droplets are discharged into the hot thrust gas by the spray nozzle or the like, a small percentage of the water droplets is converted immediately into steam but of the water mass remains in water droplet form until the water droplet are acted upon by the fluid moving device which converts most if not all of the water droplets into water vapor (steam) which is then used downstream as part of the present invention (such that back pressure is eliminated and optimized electricity generation results).

In one embodiment, there is a relationship between the dimensions of the fluid moving device and the downstream extractive turbine in that the fluid moving device has a size such that it forms the annular shaped region of water vapor that flows at high speeds immediately into the turbine blades of the extractive turbine. In other words, the fluid moving device and the extractive turbine are axially aligned and sized so that the formed region of water vapor is positioned so as to make direct contact with the turbine blades of the downstream extractive turbine.

In addition, the size and non-conical shape of the housing is purposely defined such that the volume of the thrust gas leaving the GTE is increased due to the housing containing the fluid moving device having a greater width and initially the hot thrust gas has no added water volume prior to encountering the spray device. Applicant's own patents mentioned above describe disposing water into and through the end of the main shaft and the turbine blades themselves such that the water is sprayed from the turbine blades and in some cases, the sprayed water droplets strike one or more impinging members to create fine droplets. Whereupon discharge of the water droplets into the hot thrust gas results in some cooling of the thrust gas; however, the conversion of the water droplet to vapor (steam) results in a volume increase. That is why the housing that contains the fluid moving device can be referred to as a steaming chamber in which the mixture of hot thrust gas and water droplets are converted into water vapor (steam).

It will be appreciated that the fluid moving device (mixer/agitator) of the present invention is configured such that the fluid mixture is composed of gas turbine engine thrust gas and water droplets, generated upstream thereof, encounters and is acted upon by the fluid moving device (mixer/agitator) such that an annular shaped steam product is generated around the fluid moving device (mixer agitator). This annular shaped steam product (concentrated area of steam) continues to flow downstream, whereby useful energy output is increased. For example, downstream of the fluid moving device (mixer/agitator) can be an extractive turbine from which electrical generation occurs and yields a combined cycle benefit (See, FIG. 4 which shows an optional extractive turbine at 95 which is downstream, of region 115 in which an annular shaped steam mass is formed). It will also be appreciated that the fluid moving device (mixer/agitator arrangement) disclosed herein can be used for aircraft propulsion. In addition, other points of the present invention are as follows: (1) the rotatable fluid moving device (agitator) can be powered by a rotation shaft or electric motor or pin wheel or other means; (2) the resulting annular shaped steam (as a result of the water droplets being converted to steam (gas) does not diminish the useful output by acting on the gas turbine engine section, i.e., generating undesired back pressure; (3) the blades of the agitator can be of a non-symmetrical shape to achieve radial movement of the mixture of hot trust gas and liquid (e.g., water) droplets from a centerline of the main shaft; (4) the apparatus yields useful energy output increase with droplets of other volatile liquids, such as alcohol; (5) the agitator unit can be coupled to any source of combustion gas, such as an internal combustion engine or a fired boiler, or other apparatus that burns a fuel source and generates hot gas; (6) the agitator can be coupled to a compression ignition engine and there is an extractive turbine and/or centrifugal rotor acting on increasing energy output; (7) the agitator can be attached to a fired boiler flue gas outlet and there is an extractive turbine acting on increasing energy output; (8) the agitator can be coupled to an internal combustion engine reciprocating on an aircraft or other applications and there is a conversion of currently wasted thermal energy into thrust energy; and (9) the apparatus can include more than one extractive turbine that recovers energy which can then be used to drive another device, such as an electric generator.

As is known, an extraction turbine is a steam turbine that is provided with taps through which steam may be drawn off at on or more stages for purposes (such as heating) other than driving the turbine. However, as noted, in some application, the extraction turbine can be eliminated.

The system of FIG. 8 is thus designed to increase the useful electrical mechanical energy output per unit of fuel.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A gas turbine engine comprising:
    a housing coupled via an inlet conduit to a source of hot gas and superheated water droplets, the housing having a longitudinal centerline, and an annular bay section positioned radially away from the centerline, while the inlet conduit is centered within the housing along the centerline;
    a rotatable shaft positioned along the centerline of the housing;
    a fluid mover coupled to the rotating shaft and positioned to receive the hot gas and superheated water droplets from the source of hot gas and superheated water droplets and to move the hot gas and superheated water droplets in a radial direction toward the annular bay section of the housing;
    a separator plate that is fixedly attached to a wall of the housing that is located between the fluid mover and the inlet conduit and located radially inward from the annular bay section of the housing but radially outward from the fluid mover, the separator plate being situated so as to divert portions of hot gas and water droplets that pass from the fluid mover back toward the fluid mover thus ensuring that an additional amount of the hot gas and superheated water droplets is directed radially by the fluid mover toward the annular bay section; and
    an extractive turbine assembly positioned such that the separator plate is disposed between the extractive turbine assembly and the fluid mover, wherein the separator plate is disposed between the extractive turbine assembly and the annular bay section;

wherein the superheated water droplets mix thoroughly with the hot gas inside the annular bay section, causing the water droplets to covert to steam, and the steam flows to the extractive turbine assembly, increasing an efficiency of turbine rotation.

2. The gas turbine engine of claim 1, wherein the annular bay section has a semi-circular profile in cross-section.

3. The gas turbine engine of claim 1, wherein a region within the annular bay section in which the superheated water droplets converts to steam is toroidal-shaped.

4. The gas turbine engine of claim 1, wherein the separator plate has a width that is greater than a width of the inlet conduit so as to prevent the steam or the superheated water droplets from flowing directly in an axial direction from the extractive turbine assembly into the inlet conduit.

5. The gas turbine engine of claim 1, wherein a diameter of the separator plate is larger than a diameter of the fluid mover.

6. The gas turbine engine of claim 1, wherein the fluid mover includes a plurality of blade elements that rotate with rotation of the shaft.

7. The gas turbine engine of claim 1, wherein the separator plate is attached to the housing by supports with the fluid mover disposed between the supports and the inlet conduit also disposed between the supports.

8. The gas turbine engine of claim 7, wherein a diameter of the fluid mover is at least 75% of a diameter of the conduit.

9. The gas turbine engine of claim 7, wherein the inlet conduit opens into a hollow interior space of the housing at a first location that is located directly in front of the fluid mover and the pair of supports are oriented perpendicular to both the separator plate and the wall of the housing to which the pair of supports are attached.

10. The gas turbine engine of claim 7, wherein the shaft passes through an opening formed in the separator plate.

11. The gas turbine engine of claim 1, wherein the extractive turbine assembly has a center hub and a plurality of blades arranged circumferentially about and extending radially outward from the center hub, wherein the plurality of blades are located radially beyond a peripheral edge of the separator plate.

12. The gas turbine engine of claim 11, wherein a diameter of the separator plate is equal to a diameter of the center hub.

13. The gas turbine engine of claim 11, wherein an annular shaped space is defined within the annular bay section and is located between the peripheral edge of the separator plate and an inner surface of the housing, the plurality of blades of the extractive turbine assembly being axially aligned with the annular shaped space.

14. The gas turbine engine of claim 11, wherein an axis that includes the peripheral edge of the separator plate and is parallel to a longitudinal axis of the shaft intersects a center of the annular bay section.

15. The gas turbine engine of claim 1, wherein the extractive turbine assembly includes a turbine blade assembly that is rotatably coupled to the rotatable shaft and has a width greater than both the separator plate and the fluid mover.

16. The gas turbine engine of claim 15, wherein an outer peripheral edge of the separator plate overlaps the annular bay section and an outer peripheral edge of the turbine blade assembly overlaps the annular bay section, while the fluid mover is entirely located within a center region of the housing that is spaced internal to annular bay section.

17. The gas turbine engine of claim 1, wherein the extractive turbine includes a plurality of turbine blades located circumferentially about the rotatable shaft, wherein all turbine blades of the plurality of turbine blades are located on a first side of the separator plate that is opposite a second side of the separator which faces the fluid mover.

18. A gas turbine engine comprising:
a housing coupled via an inlet conduit to a source of hot gas and superheated water droplets, the housing having a longitudinal centerline, and an annular bay section positioned radially away from the centerline, while the inlet conduit is centered within the housing along the centerline;
a rotatable shaft positioned along the centerline of the housing;
a fluid mover coupled to the rotating shaft and positioned to receive the hot gas and superheated water droplets from the source of hot gas and superheated water droplets and to move the hot gas and superheated water droplets in a radial direction toward the annular bay section of the housing;
a separator plate that is fixedly and directly attached to only a front wall of the housing by supports that are attached between the separator plate and the front wall of the housing, the front wall being located between the fluid mover and the inlet conduit and located radially inward from the annular bay section of the housing but radially outward from the fluid mover, the separator plate being situated so as to divert portions of hot gas and water droplets that pass from the fluid mover back toward the fluid mover thus ensuring that an additional amount of the hot gas and superheated water droplets is directed radially by the fluid mover toward the annular bay section;
wherein the annular bay section of the housing is located immediately adjacent to the front wall of the housing to which the separator plate is attached; and
a single extractive turbine assembly positioned such that the separator plate is disposed between the extractive turbine assembly and the fluid mover, wherein the separator plate is disposed between the extractive turbine assembly and the annular bay section, wherein the single extractive turbine assembly includes a plurality of turbine blades that are coplanar with one another;
wherein the superheated water droplets mix thoroughly with the hot gas inside the annular bay section, causing the water droplets to covert to steam, and the steam flows to the extractive turbine assembly, increasing an efficiency of turbine rotation.

19. The gas turbine engine of claim 18, wherein the inlet conduit, the rotatable shaft, the fluid mover, the separator plate and the extractive turbine assembly are coaxial to one another along the centerline of the housing.

* * * * *